United States Patent

Newton

[15] 3,676,792

[45] July 11, 1972

[54] FREQUENCY MULTIPLEXING AGC AMPLIFIER

[72] Inventor: Victor S. Newton, Takoma Park, Md.

[73] Assignee: The United States of America as represented by the Secretary of the Navy

[22] Filed: June 9, 1970

[21] Appl. No.: 44,828

[52] U.S. Cl. .................................. 330/52, 330/132, 330/145
[51] Int. Cl. ............................................................ H03g 5/16
[58] Field of Search .......................... 330/132, 144, 145, 52

[56] References Cited

UNITED STATES PATENTS

| | | | |
|---|---|---|---|
| 3,360,737 | 12/1967 | Harris et al. | 330/132 X |
| 3,147,459 | 9/1964 | McCarter | 330/132 X |
| 3,209,316 | 9/1965 | Sparks | 330/144 X |
| 2,870,271 | 1/1959 | Cronburg et al. | 330/52 X |

FOREIGN PATENTS OR APPLICATIONS

| | | | |
|---|---|---|---|
| 951,058 | 3/1964 | Great Britain | 330/134 |

*Primary Examiner*—Roy Lake
*Assistant Examiner*—James B. Mullins
*Attorney*—R. S. Sciascia, J. A. Cooke and R. J. Erickson

[57] ABSTRACT

A circuit for AGC amplification of signals in different acoustic frequency bands so that the signals in all frequency bands are normalized to the signal in one particular band by using a single logarithmic detector responsive to signals in the band to which the other bands are normalized.

2 Claims, 2 Drawing Figures

Victor S. Newton
INVENTOR

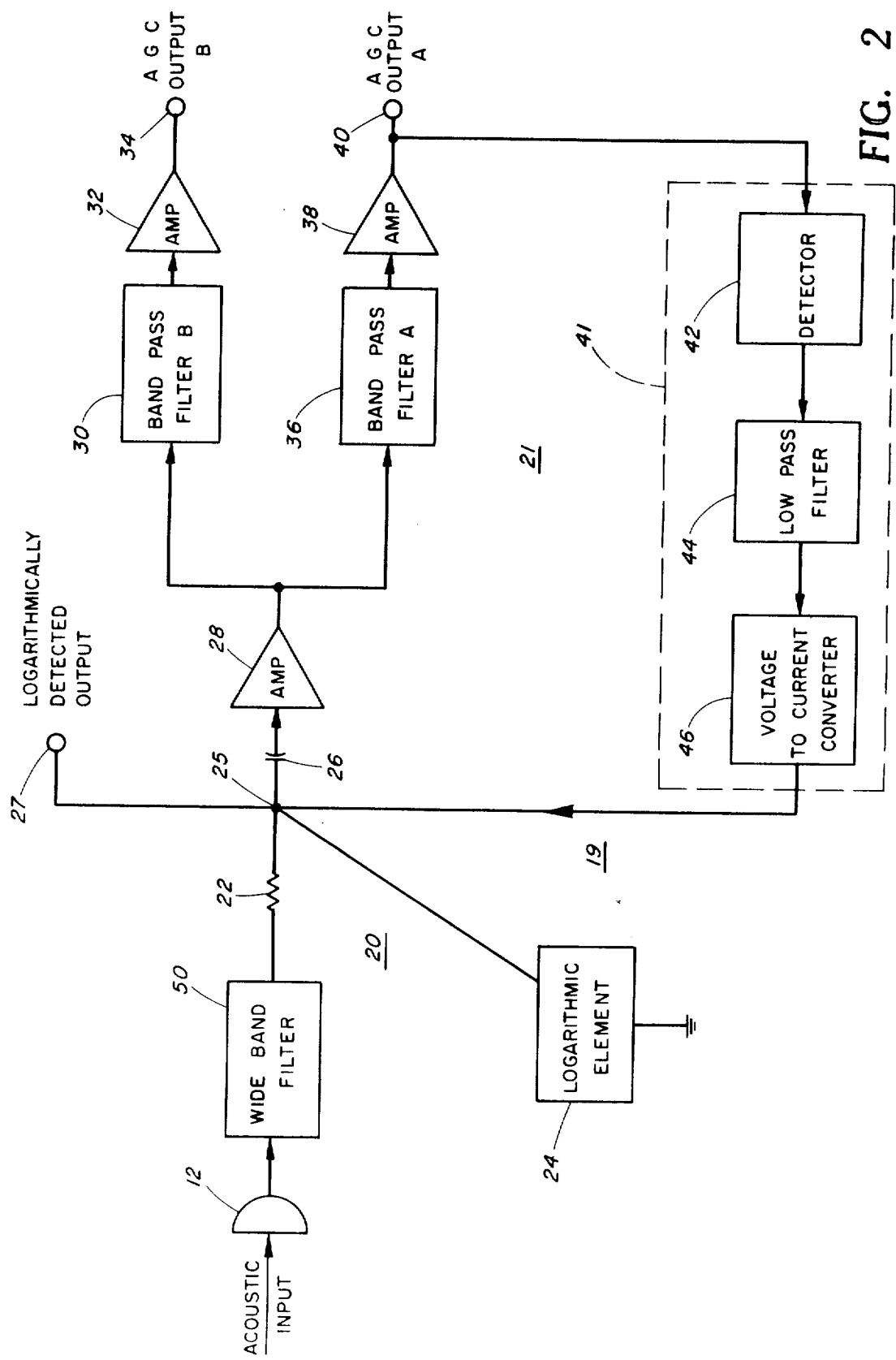

FREQUENCY MULTIPLEXING AGC AMPLIFIER

BACKGROUND OF THE INVENTION

This invention relates generally to acoustic frequency multiplexing circuitry, and more particularly to a circuit providing automatic gain control (AGC) amplification of signals in different acoustic frequency bands.

In many situations it is desirable to AGC amplify acoustic signals in different frequency bands in a manner such that the signals are normalized to the same level. For example, in identifying a moving object by its generated acoustic spectrum, or signature, the amplitudes of the acoustic signals in several narrow frequency bands within the object's wide band spectrum may be compared to determine the overall frequency characteristic of the spectrum. In this situation, the comparison is meaningful only if the relative amplitude of the narrow band segments are accurately known. When the entire unknown spectrum varies over a wide dynamic range of amplitudes, it is necessary to normalize these amplitudes using AGC circuitry. If each of the several frequency segments are not normalized to the same level, it is impossible to accurately determine the relative amplitudes of these segments and, errors will be introduced in the determination of the characteristics of the unknown spectrum.

Prior art devices achieve the AGC normalization separately for each of the several narrow frequency bands and relay on careful matching of the circuit components to maintain equal AGC levels. However, when the dynamic range of signal amplitudes under consideration is large, for example 60 db or more, it is extremely difficult to match AGC characteristics over the entire range. Thus, in prior art AGC circuits, using for example, either log diodes or solions as input log detectors the voltage-vs.-current characteristics must be matched over the entire dynamic range. This is an extremely difficult and expensive goal to achieve using these circuit devices, requiring great care in their manufacture, and testing.

SUMMARY OF THE INVENTION

Accordingly, one object of the present invention is the provision of an inexpensive and easily producible circuit for AGC amplifying acoustic signals in several different frequency bands.

Another object of the present invention is to provide an AGC amplifier for separate acoustic frequency bands having equal gains in every band.

Still another object of the present invention is the provision of a single AGC amplifier circuit for different acoustic frequency bands requiring a single logarithmic element to eliminate matching problems.

Briefly, in accordance with one embodiment of this invention, these and other objects are attained by providing a single AGC amplifier circuit employing a wide band filter to admit signals from all of the frequency bands of interest, a log detector circuit for converting the wide dynamic range input signals into the logarithms of these signals, and an AGC loop which normalizes the input signals in accordance with the level of signals in one of the frequency bands of interest.

BRIEF DESCRIPTION OF THE DRAWING

FIG. 2 is a block diagrammatic view of an alternative embodiment of an AGC circuit in which all of the narrow frequency bands of interest are passed through a single wide band input filter, logarithmically detected and AGC amplified.

DESCRIPTION OF THE PREFERRED EMBODIMENTS

Figure 1:
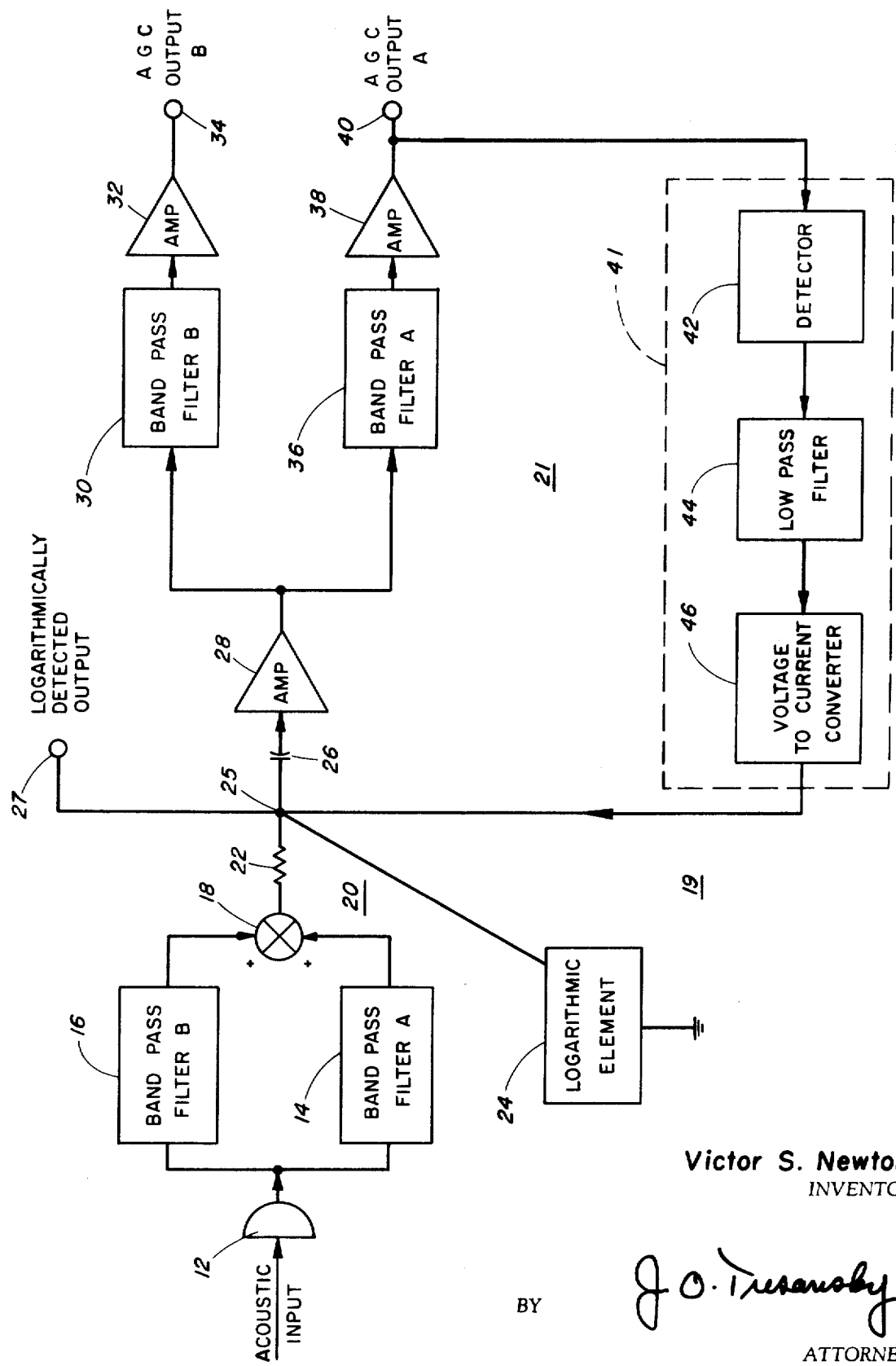
FIG. 1 is a block diagrammatic view of one embodiment of an AGC amplifier in which two acoustic frequency bands are linearly added and then logarithmically detected and AGC amplified.

Referring now to the drawings, wherein like reference characters represent identical parts throughout the several views, and more particularly to FIG. 1, wherein one embodiment of the present invention for frequency multiplexing and AGC amplifying acoustic signals in two narrow frequency bands is shown as having a transducer 12, such as a microphone or hydrophone, for receiving a wideband input acoustic signal and converting it into a wideband electrical signal. This electrical signal is then applied to two parallel coupled input band pass filters 14 and 16, one covering a narrow lower frequency band, designated as band A, and the other covering a narrow upper frequency band, designated as band B. The two narrow band signals emerging from filters 14 and 16 are then fed to a summing device 18, such as a resistive network, wherein they are added and the resultant signal applied to a logarithmic feedback detector 19 consisting of a controllable attenuator 20 and an AGC loop 21. The signal is first applied to the input of controllable attenuator 20 consisting of a resistor 22 and an element 24 having a logarithmic voltage-vs.-current characteristic, such as a semiconductor diode or a transistor. These two circuit elements act as a voltage divider, wherein the a.c. voltage at their common junction point 25 is proportional to the small-signal a.c. resistance of the log element 24, since resistor 22 is much larger than the small-signal a.c. resistance of log diode 24. The a.c. signal at junction point 25 is applied to an input capacitor 26 in an AGC loop 21. Capacitor 26 provides leakage current isolation to the remainder of the AGC loop by preventing any d.c. coupling thereto. The output from capacitor 26 is then applied to a wide band a.c. amplifier 28, and thereafter is simultaneously applied to parallel coupled band pass filters 30 and 36 respectively passing signals in upper frequency band B, and in lower frequency band A. The output signals from filter 30 are then fed to a wide band amplifier 32, which yields AGC output signals in upper band B at an output terminal 34. Similarly, the signals in lower band A emerging from filter 36 are processed through a wideband amplifier 38 and provide AGC output signals in lower band A at an output terminal 40.

To effect the AGC function by which the output signals appearing at terminals 34 and 40 are normalized to a constant level, the signals in lower band A emerging from amplifier 38 are fed to a feedback loop 41 in AGC loop 21. A detector 42 therein, such as a true RMS detector or averaging detector, which detects the a.c. signal received from amplifier 38. The resulting detected signal is fed to a low pass filter 44 which removes any remaining high frequency a.c. components from the detected signal. This signal is then fed to a voltage-to-current converter 46 the output current of which is proportional to its input voltage. The output current from converter 46 is used in a negative feedback manner to current bias the log diode 24 to the appropriate level and thereby vary the attenuation of the controllable attenuator 20 for maintaining a constant AGC output level. Biasing is done with a current rather than a voltage so that the quasi d.c. voltage across log element 24, which is proportional to the logarithm of the a.c. input signal in frequency band A at the input to controllable attenuator 20, may be sensed. This logarithmically detected output voltage appears at terminal 27. Because output current from converter 46 is either d.c. or very low frequency a.c., it is prevented from being fed back through the AGC loop by capacitor 26 and band pass filters 30 and 36.

Thus, in this embodiment it will be noted that AGC amplification of signals in two distinct narrow frequency bands is achieved using a single log detector circuit wherein the amplitudes of signals in both frequency bands are normalized to the amplitude of signals in one of the frequency bands.

FIG. 2 shows an alternate embodiment of a frequency multiplexing amplifier circuit requiring fewer elements than the circuit of FIG. 1. In this embodiment, after the acoustic input signal is converted into an electrical signal by acoustic transducer 12, it is fed to a wide band filter 50 which passes signals in both of the narrow frequency bands A and B. The signal is then processed through controllable attenuator 20 and AGC loop 21 as hereinbefore described with respect to the embodiment of FIG. 1.

From the foregoing description of FIG. 2, it will be seen that the AGC circuit of FIG. 2 requires only a single input wideband filter which is directly connected to controllable attenuator 20, while the circuit of FIG. 1 requires different filters for the separate frequency bands of interest and a device for summing the output signals from these filters before they are applied to the controllable attenuators 20. Thus, the circuit of FIG. 2 performs the same function as the circuit of FIG. 1 but is simpler and less expensive.

It will be apparent that the circuits of the instant invention achieve AGC amplification of signals in different frequency bands using the same logarithmic element for each band, thereby eliminating the need for log elements with matched characteristics. It will also be apparent that although the invention has been described in connection with audio frequency signals and only two narrow frequency bands within a given range of frequencies, the invention is equally applicable to other frequency ranges and to more than two narrow frequency bands.

Additionally, it will be apparent that a weighted filter may be used for the signals in the control frequency band A rather than a simple band pass filter having flat characteristics. By using a weighted filter, it would be possible to compensate the AGC characteristics in situations where the input spectrum in narrow band A was not completely flat.

Obviously, numerous other modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. Apparatus for identifying the signature of an object generating wideband acoustic frequency electrical signals, including a frequency multiplexing automatic gain control amplifier circuit, comprising:

input band pass filtering means responsive to said wideband acoustic frequency electrical input signal for providing a bandpass electrical signal from said wideband acoustic frequency electrical signal;

voltage divider means for controllably attenuating said bandpass signal consisting of a logarithmic responsive element and a resistor;

means for amplifying said controllably attenuated signal, including a first plurality of filters for separating a first plurality of narrow band signals in said controllably attenuated signal;

feedback means responsive to one of said first plurality of narrow band signals for varying the attenuation of said controllably attenuating means in a manner that the amplitudes of all of said first plurality of narrow band signals are normalized to a level determined by the amplitude of said one of said first plurality of narrow band signals; and output terminals coupled to each of the outputs of said plurality of filters for determining the signature of said acoustic generating object at said output terminals;

wherein said one of said narrow band signals is a lower frequency signal;

wherein said feedback means comprises: means for detecting said one of said first plurality of narrow band signals and for developing a detected voltage signal; means for removing any remaining high frequency signals from said detected voltage signal; and means for converting said detected voltage signal into a proportionate current signal, whereby said current signal is applied to said logarithmic responsive element for varying the gain of said controllably attenuating means;

wherein said amplifying means includes a capacitor between said attenuating means and said first plurality of filters to provide leakage current isolation between said amplifying means and said controllably attenuating means; and wherein said input bandpass filtering means includes a second plurality of narrow band filters providing a second plurality of narrow band signals, and means for summing said plurality of narrow band signals.

2. Apparatus as recited in claim 1 wherein said first plurality of filters comprises two bandpass filters, one high pass and one low pass; and means coupled to said logarithmic element for detecting the output of said logarithmic responsive element.

* * * * *